(12) United States Patent
Tanaka et al.

(10) Patent No.: US 6,503,986 B1
(45) Date of Patent: Jan. 7, 2003

(54) FLUORINE-CONTAINING RUBBER COMPOSITION

(75) Inventors: Hiroyuki Tanaka, Settsu (JP); Sadashige Irie, Settsu (JP); Tsuyoshi Noguchi, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/743,708

(22) PCT Filed: Jul. 14, 1999

(86) PCT No.: PCT/JP99/03792

§ 371 (c)(1),
(2), (4) Date: Jan. 16, 2001

(87) PCT Pub. No.: WO00/04091

PCT Pub. Date: Jan. 27, 2000

(30) Foreign Application Priority Data

Jul. 17, 1998 (JP) ............................................. 10-204055

(51) Int. Cl.[7] ......................... C08L 27/12; C08L 51/06; C09K 3/10; H01L 21/205; G03F 7/032
(52) U.S. Cl. ........................................ 525/199; 525/200
(58) Field of Search .................................. 525/199, 200

(56) References Cited

U.S. PATENT DOCUMENTS 6,025,436 A * 2/2000 Kawashima et al. ........ 264/175
6,228,943 B1 * 5/2001 Morikawa et al. .......... 524/463

FOREIGN PATENT DOCUMENTS

| JP | 59-68363 | 4/1984 |
| JP | 2-258324 | 10/1990 |
| JP | 3-156806 | 7/1991 |
| JP | 4-001253 | 1/1992 |

OTHER PUBLICATIONS

Translation of International Preliminary Examination Report for PCT/JP99/03792.
International Search Report for PCT/JP99/03792 dated Oct. 19, 1999.

* cited by examiner

*Primary Examiner*—Nathan M. Nutter
(74) *Attorney, Agent, or Firm*—Sughrue Mion, PLLC

(57) ABSTRACT

To provide a fluorine-containing rubber composition comprising (a-1) a non-perfluoro fluorine-containing rubber and (b-1) a fluorine-containing multi-segment polymer comprising an elastomeric fluorine-containing polymer chain segment and non-elastomeric fluorine-containing polymer chain segment, in which structural units of each of the elastomeric fluorine-containing polymer chain segment and the non-elastomeric fluorine-containing polymer chain segment comprise not less than 90% by mole of a perhalo olefin unit. The fluorine-containing rubber composition is capable of providing a clean sealing material for semi-conductor production apparatuses without using a filler.

18 Claims, No Drawings

FLUORINE-CONTAINING RUBBER COMPOSITION

TECHNICAL FIELD

The present invention relates to a fluorine-containing rubber composition and a molded article obtained from the composition, particularly a sealing material for semi-conductor production apparatuses.

BACKGROUND ART

In case of producing a sealing material, etc. by molding a composition containing a fluorine-containing rubber, addition of fillers such as a carbon black, silica, metal oxide and fluorine-containing resin fine particles has been carried out in order to maintain a shape of the sealing material, etc. by imparting a strength thereto, However recently with the development of high performance device, high cleanliness has come to be demanded particularly on a sealing material used for semi-conductor production apparatuses, and there arose a problem that the addition of such fillers became an obstacle to cleanliness of the sealing material.

The inventors of the present invention have found that by mixing a thermoplastic fluorine-containing rubber to a fluorine-containing rubber and using no fillers, it is possible to obtain a fluorine-containing rubber composition which is suitable for a sealing material for semi-conductor production apparatuses, imparts a strength to the sealing material and meets a demand for cleanliness.

An object of the present invention is to obtain a fluorine-containing rubber composition which can provide a clean sealing material for semi-conductor production apparatuses without using fillers.

DISCLOSURE OF INVENTION

The present invention relates to the fluorine-containing rubber composition comprising (a-1) a non-perfluoro fluorine-containing rubber and (b-1) a fluorine-containing multi-segment polymer comprising an elastomeric fluorine-containing polymer chain segment and non-elastomeric fluorine-containing polymer chain segment; structural units of each of the elastomeric fluorine-containing polymer chain segment and the non-elastomeric fluorine-containing polymer chain segment comprise not less than 90% by mole of a perhalo olefin unit.

Also the present invention relates to the fluorine-containing rubber composition comprising (a-1) a non-perfluoro fluorine-containing rubber and (b-2) a fluorine-containing multi-segment polymer comprising an elastomeric fluorine-containing polymer chain segment and non-elastomeric fluorine-containing polymer chain segment; a structural unit of the elastomeric fluorine-containing polymer chain segment comprises not less than 90% by mole of a perhalo olefin unit and a structural unit of the non-elastomeric fluorine-containing polymer chain segment comprises less than 90% by mole of a perhalo olefin unit.

In those cases, it is preferable that the non-perfluoro fluorine-containing rubber (a-1) is a vinylidene fluoride fluorine-containing rubber, tetrafluoroethylene/propylene fluorine-containing rubber, fluoro silicone fluorine-containing rubber or fluoro phosphazine fluorine-containing rubber.

Further the present invention relates to the fluorine-containing rubber composition comprising (a-2) a perfluoro fluorine-containing rubber and (b-3) a fluorine-containing multi-segment polymer comprising an elastomeric fluorine-containing polymer chain segment and non-elastomeric fluorine-containing polymer chain segment; a structural unit of the elastomeric fluorine-containing polymer chain segment comprises less than 90% by mole of a perhalo olefin unit and a structural unit of the non-elastomeric fluorine-containing polymer chain segment comprises not less than 90% by mole of a perhalo olefin unit or less than 90% by mole of a perhalo olefin unit.

Further the present invention relates to the fluorine-containing rubber composition comprising (a-2) a perfluoro fluorine-containing rubber and (b-1) a fluorine-containing multi-segment polymer comprising an elastomeric fluorine-containing polymer chain segment and non-elastomeric fluorine-containing polymer chain segment; structural units of each of the elastomeric fluorine-containing polymer chain segment and the non-elastomeric fluorine-containing polymer chain segment comprise not less than 90% by mole of a perhalo olefin unit.

Further the present invention relates to the fluorine-containing rubber composition comprising (a-2) a perfluoro fluorine-containing rubber and (b-2) a fluorine-containing multi-segment polymer comprising an elastomeric fluorine-containing polymer chain segment and non-elastomeric fluorine-containing polymer chain segment; a structural unit of the elastomeric fluorine-containing polymer chain segment comprises not less than 90% by mole of a perhalo olefin unit and a structural unit of the non-elastomeric fluorine-containing polymer chain segment comprises less than 90% by mole of a perhalo olefin unit.

In those cases, it is preferable that the perfluoro fluorine-containing rubber (a-2) is a fluorine-containing elastic copolymer comprising 45 to 90% by mole of tetrafluoroethylene, 10 to 50% by mole of perfluoro(alkyl vinyl ether) and 0 to 5% by mole of monomer giving a cure site.

BEST MODE FOR CARRYING OUT THE INVENTION

The greatest feature of the fluorine-containing rubber composition of the present invention is to impart a strength by adding the thermoplastic fluorine-containing rubber (b) to the fluorine-containing containing rubber (a) without using a filler and to enhance ability of maintaining a shape of a molded article.

Examples of the fluorine-containing rubber (a) which can be used in the present invention are (a-1) a non-perfluoro fluorine-containing rubber and (a-2) a perfluoro fluorine-containing rubber.

Also examples of the thermoplastic fluorine-containing rubber (b) which can be used in the present invention are: (b-1) a fluorine-containing multi-segment polymer comprising an elastomeric fluorine-containing polymer chain segment and non-elastomeric fluorine-containing polymer chain segment; structural units of each of the elastomeric fluorine-containing polymer chain segment and the non-elastomeric fluorine-containing polymer chain segment comprise not less than 90% by mole of a perhalo olefin unit, (b-2) a fluorine-containing multi-segment polymer comprising an elastomeric fluorine-containing polymer chain segment and non-elastomeric fluorine-containing polymer chain segment; a structural unit of the elastomeric fluorine-containing polymer chain segment comprises not less than 90% by mole of a perhalo olefin unit and a structural unit of the non-elastomeric fluorine-containing polymer chain segment comprises less than 90% by mole of a perhalo olefin unit, and (b-3) a fluorine-containing multi-segment polymer comprising an elastomeric fluorine-containing polymer chain segment and non-elastomeric fluorine-containing polymer chain segment; a structural unit o f the elastomeric fluorine-containing polymer chain segment comprises less than 90% by mole of a perhalo olefin unit and a structural unit of the non-elastomeric fluorine-containing polymer chain segment comprises not less than 90% by mole of a perhalo olefin unit or less than 90% by mole of a perhalo olefin unit.

Firstly the first fluorine-containing rubber composition of the present invention is explained below. The first fluorine-containing rubber composition of the present invention comprises (a-1) a non-perfluoro fluorine-containing rubber and (b-1) a fluorine-containing multi-segment polymer comprising an elastomeric fluorine-containing polymer chain segment and non-elastomeric fluorine-containing polymer chain segment; structural units of each of the elastomeric fluorine-containing polymer chain segment and the non-elastomeric fluorine-containing polymer chain segment comprise not less than 90% by mole of a perhalo olefin unit.

Examples of the non-perfluoro fluorine-containing rubber (a-1) are vinylidene fluoride (VdF) fluorine-containing rubber, tetrafluoroetylene (TFE)/propylene fluorine-containing rubber, tetrafluoroetylene (TFE)/propylene/vinylidene fluoride fluorine-containing rubber, ethylene/hexafluoropropylene (HFP) fluorine-containing rubber, ethylene/hexafluoropropylene (HFP)/vinylidene fluoride (VdF) fluorine-containing rubber, ethylene/hexafluoropropylene (HFP)/tetrafluoroethylene (TFE) fluorine-containing rubber, fluorosilicone fluorine-containing rubber, fluorophosphazine fluorine-containing rubber, and the like. Those rubbers can be used solely or in an optional combination thereof in a range not lowering an effect of the present invention.

The vinylidene fluoride fluorine-containing rubber means a fluorine-containing elastic copolymer comprising 45 to 85% by mole of vinylidene fluoride and 55 to 15% by mole of at least one other monomer copolymerizable with vinylidene fluoride.

The vinylidene fluoride fluorine-containing rubber preferably means a fluorine-containing elastic copolymer comprising 50 to 80% by mole of vinylidene fluoride and 50 to 20% by mole of at least one other monomer copolymerizable with vinylidene fluoride.

Examples of at least one other monomer copolymerizable with vinylidene fluoride are, for instance, fluorine-containing monomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ether) (PAVE) and vinyl fluoride, and non-fluorine-containing monomers such as ethylene, propylene and alkyl vinyl ether. Those monomers can be used solely or in an optional combination thereof. Among them, it is preferable to use tetrafluoroethylene, hexafluoropropylene and perfluoro (alkyl vinyl ether). Concretely there are VdF/HFP elastomer, VdF/HFP/TFE elastomer, VdF/CTFE elastomer, VdF/CTFE/TFE elastomer, and the like.

The vinylidene fluoride fluorine-containing rubber can be prepared by usual method.

The tetrafluoroethylene/propylene fluorine-containing rubber means a fluorine-containing elastic copolymer comprising 45 to 70% by mole of tetrafluoroethylene, 55 to 30% by mole of propylene and 0 to 5% by mole of monomer giving a cure site.

Examples of the monomer giving a cure site are, for instance, iodine-containing monomers such as perfluoro(6,6-dihydro-6-iodo-3-oxa-1-hexene) and perfluoro(5-iodo-3-oxa-1-pentene) disclosed in JP-B-5-63482 and JP-A-7-316234, bromine-containing monomers disclosed in JP-A-4-505341, nitrile-containing monomers disclosed in JP-A-4-505345 and JP-A-5-500070, and the like.

The tetrafluoroethylene/propylene fluorine-containing rubber can also be prepared by usual method.

Those non-perfluoro fluorine-containing rubbers (a-1) can be prepared by usual method. Examples of commercially available non-perfluoro fluorine-containing rubbers (a-1) are, for instance, DIEL G-800, G-900, and the like available from DAIKIN INDUSTRIES, LTD.

In the next place, explained below is the fluorine-containing multi-segment polymer (b-1) which is a thermoplastic fluorine-containing rubber comprising an elastomeric fluorine-containing polymer chain segment and non-elastomeric fluorine-containing polymer chain segment, in which structural units of each of the elastomeric fluorine-containing polymer chain segment and the non-elastomeric fluorine-containing polymer chain segment comprise not less than 90% by mole of a perhalo olefin unit.

Firstly the elastomeric fluorine-containing polymer chain segment is explained. The elastomeric fluorine-containing polymer chain segment imparts flexibility to a polymer and has a glass transition temperature of not more than 25° C., preferably not more than 0° C. Examples of the perhalo olefin unit contained as a structural unit thereof in an amount of not less than 90% by mole are, for instance, tetrafluoroethylene, chlorotrifluoroethylene, hexafluoropropylene, fluorovinyl ether represented by the formula (2):

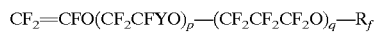

wherein Y is F or $CF_3$, $R_f$ is a perfluoroalkyl group having 1 to 5 carbon atoms, p is 0 or an integer of 1 to 5, q is 0 or an integer of 1 to 5, and the like.

Examples of the structural unit other than the perhalo olefin unit of the elastomeric fluorine-containing polymer chain segment may be, for instance, fluorine-containing monomers such as vinylidene fluoride, trifluoroethylene, trifluoropropylene, tetrafluoropropylene, pentafluoropropylene, trifluorobutene, tetrafluoroisobutene and vinyl fluoride, non-fluorine-containing monomers such as ethylene, propylene and alkyl vinyl ether, and the like.

Example of the preferred elastomeric fluorine-containing polymer chain segment is an elastic polymer chain comprising 50 to 85% by mole of tetrafluoroethylene, 50 to 15% by mole of perfluoro(alkyl vinyl ether) and 0 to 5% by mole of monomer giving a cure site.

Examples of the monomer giving a cure site are, for instance, vinylidene fluoride, iodine- or bromine-containing monomers represented by the formula (3):

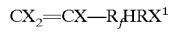

wherein X is H, F or $CH_3$, $R_f$ is a fluoroalkylene group, perfluoroalkylene group, fluoropolyoxyalkylene group or perfluoropolyoxyalkylene group, R is H or $CH_3$, $X^1$ is iodine or bromine, various nitrile-containing monomers represented by the formula (4):

wherein m is 0 or an integer of 1 to 5, n is an integer of 1 to 3, and the like.

Then the non-elastomeric fluorine-containing polymer chain segment is explained below. Examples of the perhalo olefin unit contained as a structural unit of the non-elastomeric fluorine-containing polymer chain segment in an amount of not less than 90% by mole are, for instance, tetrafluoroethylene, chlorotrifluoroethylene, perfluoro(alkyl vinyl ether), hexafluoropropylene, compounds represented by the formula (5):

$$CF_2=CF(CF_2)_pX$$

wherein p is an integer of 1 to 10, X is F or Cl, perfluoro-2-butene, and the like.

Examples of the structural unit other than the perhalo olefin unit of the non-elastomeric fluorine-containing polymer chain segment may be, for instance, fluorine-containing monomers such as vinylidene fluoride, trifluoroethylene, trifluoropropylene, tetrafluoropropylene, pentafluoropropylene, trifluorobutene, tetrafluoroisobutene and vinyl fluoride, non-fluorine-containing monomers such as ethylene, propylene and alkyl vinyl ether, and the like.

Example of the preferred non-elastomeric fluorine-containing polymer chain segment is a non-elastic polymer chain comprising 85 to 100% by mole of tetrafluoroethylene and 0 to 15% by mole of a compound represented by the formula (6):

$$CF_2=CF-R_f$$

wherein $R_f$ is $R_f^1$ or $-OR_f^1$, $R_f^1$ is a perfluoroalkyl group having 1 to 5 carbon atoms.

From the viewpoint of heat resistance of the obtained thermoplastic fluorine-containing rubber (fluorine-containing multi-segment polymer), it is preferable that a crystalline melting point of the non-elastomeric fluorine-containing polymer chain segment is not less than 150° C., more preferably 200° to 360° C.

Namely it is important that the fluorine-containing multi-segment polymer of the present invention is a fluorine-containing multi-segment polymer comprising the elastomeric fluorine-containing polymer chain segment and non-elastomeric fluorine-containing polymer chain segment bonded in blocked or grafted form in one molecule thereof.

In order to prepare the fluorine-containing multi-segment polymer (b-1) by bonding the elastomeric segment and non-elastomeric segment in blocked or grafted form, various known methods can be adopted. Among them, a preparation process of a block type fluorine-containing multi-segment polymer disclosed in JP-B-58-4728, a preparation process of a graft type fluorine-containing multi-segment polymer disclosed in JP-A-62-34324, and the like are used preferably.

Especially preferred is a block type fluorine-containing multi-segment polymer synthesized by a so-called iodine transfer polymerization method described in JP-B-58-4728 and Kobunshi Ronbunshu (Vol. 49, No. 10, 1992) since a uniform regularly segmented polymer having a high segment ratio (block ratio) can be obtained.

On the other hand, in case of use of a mere mixture of elastomeric fluorine-containing polymer and non-elastomeric fluorine-containing polymer, generally mechanical properties (especially at high temperature) become insufficient, and abrasion resistance, flexibility and durability are lowered, depending on kinds of respective polymers to be mixed, admiscibility, compatibility, etc.

On the contrary by bonding the elastomeric segment and non-elastomeric segment by blocking or grafting like the present invention, heat resistance, mechanical properties (especially at high temperature), etc. of the multi-segment polymer are enhanced as compared with the above-mentioned polymer prepared by merely mixing elastomeric fluorine-containing polymer and non-elastomeric fluorine-containing polymer.

The elastomeric segment can be prepared by iodine transfer polymerization method which is known as a preparation process of fluorine-containing rubbers (JP-B-58-4728, JP-A-62-12734).

For example, there is a method of emulsion-polymerizing the above-mentioned perhalo olefin and if necessary, a monomer giving a cure site with stirring under pressure in an aqueous medium substantially in the absence of oxygen in the presence of a radical initiator and iodine compound, preferably diiodine compound.

Typical examples of the diiodine compound to be used are, for instance, 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane and 1,2-diiodoethane. Those compounds may be used solely or can be used in combination thereof. Among them, 1,4-diiodoperfluorobutane is preferred. An amount of diiodine compound is 0.01 to 1% by weight based on a total weight of the elastomeric segment.

The radical polymerization initiator to be used for preparing the elastomeric segment of the present invention may be the same as an initiator having been used for polymerization of a fluorine-containing elastomer. Examples of such an initiator are organic and inorganic peroxides and azo compounds. Typical examples of the initiator are persulfates, peroxy carbonates, peroxy esters, and the like. Example of a preferred initiator is ammonium persulfate (APS). APS may be used solely, and can be used in combination with a reducing agent like sulfites.

For the emulsion polymerization, various emulsifying agents can be used. From the viewpoint of inhibiting a chain transfer reaction against the molecules of emulsifying agent which arises during the polymerization, desirable emulsifying agents are salts of carboxylic acid having a fluorocarbon chain or fluoropolyether chain. It is desirable that an amount of emulsifying agent is from about 0.05% by weight to about 2% by weight, particularly 0.2 to 1.5% by weight based on the added water.

The monomer mixture gas to be used in the present invention is explosive as described in Advances in Chemistry Series, G. H. Kalb et al., 129,13 (1973). Therefore it is necessary to take measures so that in a polymerization equipment, no sparking as an ignition source arises. For that reason, it is preferable that a polymerization pressure is as low as possible.

The polymerization pressure can be changed in a wide range, and in general is in a range of 0.5 to 5 MPa. The higher the polymerization pressure is, the more the polymerization rate is increased, and therefore from the point of enhancing productivity, the polymerization pressure is desirably not less than 0.8 MPa.

It is preferable that a number average molecular weight of the so-obtained elastomeric segment is 5,000 to 750,000, especially 20,000 to 400,000 from the viewpoint of imparting flexibility, elasticity and mechanical properties to the whole fluorine-containing multi-segment polymer.

An end of the thus-obtained elastomeric segment is of perhalo type and has iodine atom which becomes a starting point of block copolymerization of the non-elastomeric segment.

Then subsequent to the emulsion polymerization of the elastomeric segment, the block copolymerization of the non-elastomeric segment can be carried out by changing monomers to those for the non-elastomeric segment.

A number average molecular weight of the non-elastomeric segment can be adjusted in a wide range of 1,000 to 1,200,000, preferably 3,000 to 600,000.

The thus-obtained fluorine-containing multi-segment polymer (b-1) mainly comprises polymer molecules having the elastomeric segment bonded to the non-elastomeric segments at both ends thereof and polymer molecules having the elastomeric segment bonded to the non-elastomeric segment at one end thereof. An amount of polymer molecules having only the elastomeric segment which is not bonded to the non-elastomeric segment is not more than 20% by weight, preferably not more than 10% by weight based on a total amount of the polymer molecules and the segments in the fluorine-containing multi-segment polymer.

The first fluorine-containing rubber composition of the present invention can be obtained by mixing (a-1) the non-perfluoro fluorine-containing rubber obtained as mentioned above to (b-1) the fluorine-containing multi-segment polymer in a state of dispersion or by mixing them at an optional ratio by dry-blending with an open roll, or the like.

Also for the purpose to improve mold releasing property at molding, additives such as an internal mold releasing agent can be added optionally in a range not lowering an effect of the present invention. Also a crosslinking agent can be added depending on crosslinking methods mentioned hereinafter.

In the so-obtained first fluorine-containing rubber composition of the present invention, the fluorine-containing multi-segment polymer (b-1) is inferior particularly in radiation crosslinking efficiency mentioned later and cannot be crosslinked substantially in case of single use thereof. However by adding the non-perfluoro fluorine-containing rubber (a-1) having a cure site, a crosslinkable composition can be obtained. Further the composition does not contain a filler, and when the radiation crosslinking mentioned later is carried out, since a crosslinking agent is not contained, a very clean molded article can be obtained.

Then the second fluorine-containing rubber composition of the present invention is explained below. The second fluorine-containing rubber composition of the present invention comprises (a-1) a non-perfluoro fluorine-containing rubber and (b-2) a fluorine-containing multi-segment polymer comprising an elastomeric fluorine-containing polymer chain segment and non-elastomeric fluorine-containing polymer chain segment, in which a structural unit of the elastomeric fluorine-containing polymer chain segment comprises not less than 90% by mole of a perhalo olefin unit and a structural unit of the non-elastomeric fluorine-containing polymer chain segment comprises less than 90% by mole of a perhalo olefin unit.

The non-perfluoro fluorine-containing rubber (a-1) may be the same as that of the above-mentioned first fluorine-containing rubber composition.

Subsequently the fluorine-containing multi-segment polymer (b-2) is explained below.

In this case, the elastomeric fluorine-containing polymer chain segment may be the same as that explained in the above-mentioned fluorine-containing multi-segment polymer (b-1).

The non-elastomeric fluorine-containing polymer chain segment is a polymer chain having a crystalline melting point of not less than 150° C., preferably 200° to 360° C.

As the structural unit of the non-elastomeric fluorine-containing polymer chain segment, there are vinylidene fluoride, vinyl fluoride, trifluoroethylene, a compound represented by the formula (7):

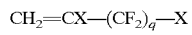

$$CH_2=CX\text{—}(CF_2)_q\text{—}X$$

wherein X is H or F, q is an integer of 1 to 10, a partially fluorinated olefin such as $CH_2=C(CF_3)_2$, and the like.

Also monomers copolymerizable with those monomers such as ethylene, propylene, vinyl chloride, vinyl ether, vinyl esters of carboxylic acids and acrylic acid can be used as copolymerizable components.

The fluorine-containing multi-segment polymer (b-2) can be prepared in the same manner as in the fluorine-containing multi-segment polymer (b-1).

The second fluorine-containing rubber composition of the present invention can be obtained from the above-mentioned non-perfluoro fluorine-containing rubber (a-1) and fluorine-containing multi-segment polymer (b-2) in the same manner as in the first fluorine-containing rubber composition.

In that case, the above-mentioned additives can be added optionally in a range not lowering an effect of the present invention, and also a crosslinking agent can be added depending on crosslinking methods mentioned later.

With respect to the fluorine-containing multi-segment polymer (b-2), particularly an efficiency of radiation crosslinking mentioned later fluctuates depending on components thereof. However in the second fluorine-containing rubber composition of the present invention, by adding the non-perfluoro fluorine-containing rubber (a-1) having a particularly good efficiency of radiation crosslinking, crosslinking efficiency is improved. Further the composition does not contain a filler, and when the radiation crosslinking mentioned later is carried out, since a crosslinking agent is not contained, a very clean molded article can be obtained.

Then the third fluorine-containing rubber composition of the present invention is explained below. The third fluorine-containing rubber composition of the present invention comprises (a-2) a perfluoro fluorine-containing rubber and (b-3) a fluorine-containing multi-segment polymer comprising an elastomeric fluorine-containing polymer chain segment and non-elastomeric fluorine-containing polymer chain segment, in which a structural unit of the elastomeric fluorine-containing polymer chain segment comprises less than 90% by mole of a perhalo olefin unit and a structural unit of the non-elastomeric fluorine-containing polymer chain segment comprises not less than 90% by mole of a perhalo olefin unit or less than 90% by mole of a perhalo olefin unit.

The perfluoro fluorine-containing rubber (a-2) is a fluorine-containing elastic monomer comprising 45 to 90% by mole of tetrafluoroethylene, 10 to 50% by mole of perfluoro(alkyl vinyl ether) and 0 to 5% by mole of monomer giving a cure site.

In that case, examples of perfluoro(alkyl vinyl ether) are, for instance, perfluoro(methyl vinyl ether), perfluoro(propyl vinyl ether), and the like which can be used solely or in optional combination thereof in a range not lowering an effect of the present invention.

Examples of the monomer giving a cure site are, for instance, vinylidene fluoride, $CX_2=CX\text{—}R_f CHRI$, $CF_2=CFO(CF_2CF(CF_3))_m\text{—}O\text{—}(CF_2)_n\text{—}CN$, and the like which can be used solely or in optional combination thereof in a range not lowering an effect of the present invention.

The perfluoro fluorine-containing rubber (a-2) can be prepared by usual method.

Examples of the perfluoro fluorine-containing rubber (a-2) are fluorine-containing rubbers described in WO97/24381, JP-B-61-57324, JP-B-4-81608, JP-B-5-13961, etc.

Subsequently the fluorine-containing multi-segment polymer (b-3) is explained below. The elastomeric fluorine-containing polymer chain segment of the fluorine-containing multi-segment polymer (b-3) is a polymer chain having a glass transition temperature of not more than 25° C., preferably not more than 0° C.

Also a structural unit of the elastomeric fluorine-containing polymer chain segment comprises less than 90% by mole of a perhalo olefin unit. Structural units other than the perhalo olefin unit may be the same as those explained in the vinylidene fluoride fluorine-containing rubber of the above-mentioned non-perfluoro fluorine-containing rubber (a-1).

The non-elastomeric fluorine-containing polymer chain segment of the fluorine-containing multi-segment polymer (b-3) may be the same as the non-elastomeric fluorine-containing polymer chain segment of the above-mentioned fluorine-containing multi-segment polymer (b-1) or (b-2), particularly the non-elastomeric fluorine-containing polymer chain segment of (b-2).

The fluorine-containing multi-segment polymer (b-3) comprises 40 to 95% by weight of elastomeric fluorine-containing polymer chain segment and 5 to 60% by weight of non-elastomeric fluorine-containing polymer chain segment.

The fluorine-containing multi-segment polymer (b-3) can be prepared in the same manner as in the fluorine-containing multi-segment polymers (b-1) and (b-2).

Examples of the fluorine-containing multi-segment polymer (b-3) are, for instance, DIEL THERMO T-530, T-550 and T-630 available from DAIKIN INDUSTRIES, LTD., CEFRAL SOFT available from CENTRAL GLASS CO., LTD., and the like.

The third fluorine-containing rubber composition of the present invention can be obtained from the above-mentioned perfluoro fluorine-containing rubber (a-2) and fluorine-containing multi-segment polymer (b-3) in the same manner as in the first and second fluorine-containing rubber compositions.

Also the above-mentioned additives can be added optionally in a range not lowering an effect of the present invention, and also a crosslinking agent can be added depending on crosslinking methods mentioned later.

The above-mentioned perfluoro fluorine-containing rubber (a-2) is inferior particularly in radiation crosslinking efficiency, and in case of single use thereof, after molding, a shape of a molded article cannot be maintained and thus crosslinking cannot be carried out substantially. However in the third fluorine-containing rubber composition of the present invention, by adding the fluorine-containing multi-segment polymer (b-3) being excellent particularly in radiation crosslinking efficiency, a property of maintaining a shape of molded article becomes excellent and a crosslinking efficiency is improved. Further the composition does not contain a filler, and particularly when the radiation crosslinking mentioned later is carried out, since a crosslinking agent is not contained, a very clean molded article can be obtained.

Then the fourth fluorine-containing rubber composition of the present invention is explained below. The fourth fluorine-containing rubber composition of the present invention comprises (a-2) a perfluoro fluorine-containing rubber and (b-1) a fluorine-containing multi-segment polymer comprising an elastomeric fluorine-containing polymer chain segment and non-elastomeric fluorine-containing polymer chain segment, in which structural units of each of the elastomeric fluorine-containing polymer chain segment and the non-elastomeric fluorine-containing polymer chain segment comprise not less than 90% by mole of a perhalo olefin unit.

The perfluoro fluorine-containing rubber (a-2) and fluorine-containing multi-segment polymer (b-1) may be the same as those mentioned above.

The fourth fluorine-containing rubber composition of the present invention can be obtained from the above-mentioned perfluoro fluorine-containing rubber (a-2) and fluorine-containing multi-segment polymer (b-1) in the same manner as in the first, second and third fluorine-containing rubber compositions.

Also the above-mentioned additives can be added optionally in a range not lowering an effect of the present invention, and also a crosslinking agent can be added depending on crosslinking methods mentioned later.

Both of the above-mentioned perfluoro fluorine-containing rubber (a-2) and fluorine-containing multi-segment polymer (b-1) are inferior in radiation crosslinking efficiency and radiation crosslinking cannot be carried out substantially. Therefore in case of carrying out crosslinking, it is necessary that a cure site is introduced to at least one rubber to enable peroxide crosslinking and then the peroxide crosslinking is carried out.

As a fluorine-containing rubber having a cure site, suitable are fluorine-containing rubbers having iodine or bromine introduced at an end of polymer. The fluorine-containing rubber can be obtained by polymerizing in the presence of a compound represented by the formula (1):

$$RI_xBr_y$$

wherein R is a saturated or unsaturated fluoro hydrocarbon group or chlorofluoro hydrocarbon group having 1 to 16 carbon atoms or a hydrocarbon group having 1 to 3 carbon atoms, each of x and y is 0, 1 or 2, $1 \leq x+y \leq 2$. Thus-introduced iodine or bromine functions as a cure site.

Examples of the compound represented by the formula (1) are, for instance, monoiodomonobromo-substituted product, diiodomonobromo-substituted product and (2-iodoethyl)- and (2-bromoethyl)-substituted products of 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1 and benzene.

Among them, from the viewpoint of polymerization reactivity, crosslinking reactivity and availability, 1,4-diiodoperfluorobutane and diiodomethane are preferably used. An adding amount of the compound represented by the formula (1) may be from 0.0001 to 5% by weight, preferably 0.01 to 1% by weight based on a total weight of the obtained fluorine-containing rubber.

Another method for introducing a cure site is a method of copolymerizing a small amount of monomer giving a cure site.

Examples of suitable monomer are iodine-containing monomers such as perfluoro(6,6-dihydro-6-iodo-3-oxa-1-hexene) and perfluoro(5-iodo-3-oxa-1-pentene) disclosed in JP-B-5-63482 and JP-A-7-316234, bromine-containing monomers disclosed in JP-A-4-505341, nitrile-containing monomers disclosed in JP-A-4-505345 and JP-A-5-500070, and the like.

Then the fifth fluorine-containing rubber composition of the present invention is explained below. The fifth fluorine-containing rubber composition of the present invention comprises (a-2) a perfluoro fluorine-containing rubber and (b-2) a fluorine-containing multi-segment polymer comprising an elastomeric fluorine-containing polymer chain segment and non-elastomeric fluorine-containing polymer chain segment, in which a structural unit of the elastomeric fluorine-containing polymer chain segment comprises not less than 90% by mole of a perhalo olefin unit and a structural unit of the non-elastomeric fluorine-containing polymer chain segment comprises less than 90% by mole of a perhalo olefin unit.

The perfluoro fluorine-containing rubber (a-2) and the fluorine-containing multi-segment polymer (b-2) may be the same as mentioned above.

The fifth fluorine-containing rubber composition of the present invention can be obtained from the above-mentioned perfluoro fluorine-containing rubber (a-2) and fluorine-containing multi-segment polymer (b-2) in the same manner as in the first, second, third and fourth fluorine-containing rubber compositions.

Also the above-mentioned additives can be added optionally in a range not lowering an effect of the present invention, and also a crosslinking agent can be added depending on crosslinking methods mentioned later.

The above-mentioned perfluoro fluorine-containing rubber (a-2) is inferior particularly in radiation crosslinking efficiency, and in case of single use thereof, after molding, a shape of a molded article cannot be maintained and thus crosslinking cannot be carried out substantially. However in the fifth fluorine-containing rubber composition of the present invention, by adding the fluorine-containing multi-segment polymer (b-2) being excellent particularly in radiation crosslinking efficiency, a property of maintaining a shape of molded article becomes excellent and a crosslinking efficiency and mechanical characteristics are improved. Further the composition does not contain a filler, and particularly when the radiation crosslinking mentioned later is carried out, since a crosslinking agent is not contained, a very clean molded article can be obtained.

The 1st to 5th fluorine-containing rubber compositions of the present invention are excellent in transparency because no filler is contained therein, and a hardness thereof can be adjusted by optionally selecting components and molecular weight of the thermoplastic fluorine-containing rubber (b). By adding the thermoplastic fluorine-containing rubber (b), the composition has a property of maintaining a shape even in non-crosslinked state and can be processed into a molded article as it is. In that case, by crosslinking, mechanical characteristics can be further enhanced, and a high purity and high performance sealing material can be obtained. Also a hardness of the composition can be adjusted by optionally selecting a proportion of the thermoplastic fluorine-containing rubber (b).

Namely the 1st to 5th fluorine-containing rubber compositions of the present invention can be molded into, for example, a form of a sealing material, tube, sheet, or the like by usual method. Namely the present invention also relates to the molded article which is a sealing material or a molded article having a form of tube, sheet, or the like obtained from the 1st to 5th fluorine-containing rubber compositions of the present invention.

Particularly the 1 st to 5th fluorine-containing rubber compositions of the present invention are excellent in transparency because a filler preventing cleanliness from being obtained is not an essential component. Thus the sealing material can be suitably used for semi-conductor production apparatuses. Accordingly the present invention also relates to semi-conductor production apparatuses provided with the sealing material. Examples of the semi-conductor production apparatuses are, for instance, etching system, cleaning system, exposing system, polishing system, film forming system, diffusion and ion implantation system, and the like.

The sealing material can be used built in the following semiconductor production apparatuses.

(1) Etching System
  Dry etching equipment
  Plasma etching machine
  Reactive ion etching machine
  Reactive ion beam etching machine
  Sputter etching machine
  Ion beam etching machine
  Wet etching equipment
  Ashing equipment
(2) Cleaning System
  Dry etching cleaning equipment
  UV/$O_3$ cleaning machine
  Ion beam cleaning machine
  Laser beam cleaning machine
  Plasma cleaning machine
  Gas etching cleaning machine
  Extractive cleaning equipment
  Soxhlet extractive cleaning machine
  High temperature high pressure extractive cleaning machine
  Microwave extractive cleaning machine
  Supercritical extractive cleaning machine
(3) Exposing System
  Stepper
  Coater and developer
(4) Polishing System
  CMP equipment
(5) Film Forming System
  CVD equipment
  Sputtering equipment
(6) Diffusion and Ion Implantation System
  Oxidation and diffusion equipment
  Ion implantation equipment Though the 1st to 5th fluorine-containing rubber compositions of the present invention have an enough hardness and therefore a shape of the above-mentioned molded article can be maintained even without crosslinking, its hardness can be further enhanced by crosslinking by usual method.

For crosslinking, there are two methods of (1) peroxide crosslinking and (2) radiation crosslinking (except the above-mentioned fourth fluorine-containing rubber composition).

(1) Peroxide Crosslinking

A crosslinking agent to be used for the peroxide crosslinking may be an organic peroxide which can easily produce peroxy radical in the presence of heat or oxidation-reduction system. Examples thereof are, for instance, 1,1-bis(t-butylperoxy)-3,5,5-trimethylcyclohexane, 2,5-dimethylhexane-2,5-dihydroperoxide, di-t-butylperoxide, t-butylcumylperoxide, dicumylperoxide, α,α-bis(t-butylperoxy)-p-diisopropyl benzene, 2,5-dimethyl-2,5-di(t-butylperoxy)hexane, 2,5-dimethyl-2,5-di(t-butylperoxy)-hexyne-3, benzoylperoxide, t-butylperoxy benzene, 2,5-dimethyl-2,5-di(benzoylperoxy)hexane, t-butylperoxy maleate, t-butylperoxyisopropyl carbonate, and the like. Among them, preferable are those of dialkyl type. Further 2,5-dimethyl-2,5-di(t-butylperoxy)hexane is particularly preferable. In general kind and amount of the organic peroxide are selected in consideration of an amount of active —O—O—, a decomposition temperature, etc.

A crosslinking aid which can be used for the crosslinking may be a compound having a reactivity to a peroxy radical and polymer radical. Examples thereof are, for instance, polyfunctional compounds having functional group such as $CH_2$=CH—, $CH_2$=CHCH$_2$— or $CF_2$=CF—. For example, there are triallylcyanurate, triallylisocyanurate (TAIC), triacrylformal, triallyltrimellitate, N,N'-n-phenylenebismaleimide, dipropargylterephthalate, diallylphthalate, tetraallylterephthalateamide, triallylphosphate, bismaleimide, fluorinated triallylisocyanurate(1,3,5-tris(2,3,3-trifluoro-2-propenyl)-1,3,5-triazine-2,4,6-trion, and the like.

(2) Radiation Crosslinking

In case of this radiation crosslinking, the same compound as the crosslinking aid used in the above-mentioned peroxide crosslinking may be added as an additive for the radiation crosslinking. An amount thereof is preferably 0.1 to 10 parts by weight, particularly preferably 0.3 to 5 parts by weight based on 100 parts by weight of polymer.

In case of the radiation crosslinking, after molding the fluorine-containing rubber composition into a desired form, a molded article is subjected to irradiation of ionizing radiation having high energy enough for transmission into the molded article, for example, X-rays, gamma-rays, electron beams, protons, deuterons, α-rays, β-rays, or the like. In that case, a quantity of radiation may be 0.1 to 50 Mrad. An irradiation temperature may be −20° C. to 100° C. The irradiation may be carried out in the presence of atmosphere such as air, nitrogen, argon or helium, or under vacuum. From the viewpoint of prevention of deterioration of a surface of molded article by oxidation, it is preferable to carry out the irradiation in the presence of inert gas such as nitrogen, argon or helium, particularly preferably under vacuum.

For the irradiation of ionizing radiation, a known irradiation machine can be used.

The molded articles which can be obtained by crosslinking the 1st to 5th fluorine-containing rubber compositions of the present invention have excellent transparency and cleanliness in addition to heat resistance, chemical resistance, solvent resistance, oil resistance, abrasion resistance and sealing property which are inherent to fluorine-containing rubbers.

The present invention is then explained by means of examples, but is not limited to them.

EXAMPLES 1 to 3

Third Fluorine-containing Rubber Composition

The third fluorine-containing rubber composition of the present invention was prepared by dry-blending at room temperature with a 8-inch open roll by using a rubber comprising 60% by mole of TFE, 40% by mole of PMVE and 0.3% by mole of I(CH$_2$CF$_2$CF$_2$O)m(CF(CF$_3$)CF$_2$O)nCF=CF$_2$, in which m is an integer of 1 to 5, n is 0 or an integer of 1 to 3, as the perfluoro fluorine-containing rubber (a-2) and an elastomer comprising 75% by weight of elastomeric fluorine-containing polymer chain segment comprising 50% by mole of VdF, 30% by mole of HFP and 20% by mole of TFE and 25% by weight of non-elastomeric fluorine-containing polymer chain segment comprising 42% by mole of ethylene, 50% by mole of TFE and 8% by mole of HFP as the fluorine-containing multi-segment polymer (b-3).

Then the composition was molded at 240° C. by using a heat press and cooled to room temperature to give a sample sheet for testing. A 100% tensile stress (M100), tensile strength (TS), elongation (EL) and hardness (HS) were measured in accordance with JIS K 6301.

Also the sample was subjected to crosslinking by irradiation of 100 KGr gamma-rays at room temperature in nitrogen atmosphere, and the same measurement were carried out. The results are shown in Table 1.

Comparative Example 1

A fluorine-containing rubber composition for comparison as prepared in the same manner as in Example 1 except that a proportion of components were changed as shown in Table 1, and the same measurements as in Example 1 were carried out. The results are shown in Table 1.

TABLE 1

|  | Example | | | Com. |
|---|---|---|---|---|
|  | 1 | 2 | 3 | Ex. 1 |
| Perfluoro fluorine-containing rubber (a-2) | 50 | 67 | 80 | 100 |
| Fluorine-containing multi-segment polymer (b-3) | 50 | 33 | 20 | 0 |
| Original state (non-crosslinked) | | | | |
| 100% tensile stress (kgf/cm$^2$) (M100) | 16 | 16 | 15 | 14 |
| Tensile strength (kgf/cm$^2$) (TS) | 46 | 38 | 32 | 28 |
| Elongation (%) (EL) | 600 | 640 | 670 | 750 |
| Hardness (JIS, A) (HS) | 64 | 64 | 64 | 64 |
| Original state (after irradiation of radiation, 100 KGr, in nitrogen) | | | | |
| 100% tensile stress (kgf/cm$^2$) (M100) | 22 | 19 | 16 | 14 |
| Tensile strength (kgf/cm$^2$) (TS) | 135 | 114 | 78 | 30 |
| Elongation (%) (EL) | 320 | 400 | 400 | 750 |
| Hardness (JIS, A) (HS) | 68 | 67 | 64 | 64 |

It can be seen from Table 1 that when the composition comprises only the perfluoro fluorine-containing rubber (a-2), there is no change in physical properties before and after the crosslinking and no crosslinking occurred (Comparative Example 1). From Examples 1 to 3, after the crosslinking, increase in tensile stress, tensile strength and hardness and lowering of elongation were recognized, and it can be seen that the fluorine-containing rubber composition of the present invention is very suitable for a sealing material.

EXAMPLES 4 to 11

Fourth Fluorine-containing Rubber Composition

An elastomer comprising 60% by mole of TFE and 40% by mole of PMVE and having an iodine content of 0.30% by weight derived from a monomer ICH$_2$CF$_2$CF$_2$OCF=CF$_2$ giving a cure site was used as the is perfluoro fluorine-containing rubber (a-2). As the fluorine-containing multi-segment polymer (b-1), the following polymers were used.
① SS (Mw)=25000, HS (% by mole)=18, HS: PTFE
② SS (Mw)=25000, HS (% by mole)=32, HS: PTFE
③ SS (Mw)=25000, HS (% by mole)=50, HS: PTFE
④ SS (Mw)=25000, HS (% by mole)=21, HS: PFA, C$_3$VE (% by mole)=5.7
⑤ SS (Mw)=25000, HS (% by mole)=19, HS: PFA, C$_3$VE (% by mole)=2.6

⑥ SS (Mw)=25000, HS (% by mole)=20, HS: PFA, C₃VE (% by mole)=0.8
⑦ SS (Mw)=50000, HS (% by mole)=22, HS: PFA, C₃VE (% by mole)=4.8

SS represents a soft (elastomeric) segment, and HS represents a hard (non-elastomeric) segment.

Mixing and kneading were carried out in a mixing amount shown in Tables 2 and 3 on a water-cooled rubber roll, followed by allowing to stand one day and night. The aged composition for vulcanization was subjected to re-kneading to enhance re-dispersibility and then sheeting. Then after cutting into a desired form and putting into a die, press-vulcanization (crosslinking) was carried out at 160° C. for 10 minutes for molding into a 2 mm thick sheet and O-ring (P-24). Then the vulcanization (crosslinking) was completed at 180° C. for four hours in an electric oven.

With respect to the thus-obtained rubber sheet and O-ring, physical properties in original state and compression set (CS) were measured (according to JIS K 6301). Also a vulcanization curve at 160° C. of each composition for vulcanization was obtained with JSR Curastometer Model II to determine a minimum viscosity (ML), degree of vulcanization (MH), induction period (T10) and optimum vulcanization time (T90).

The results are shown in Tables 2 and 3.

Comparative Examples 2 to 7

Fluorine-containing rubber compositions for comparison were obtained and measurements were made in the same manner as in Example 4 except that a mixing amount was changed as shown in Tables 2 and 3. The results are shown in Table 2.

TABLE 2

|  | Example |  |  |  |  | Comparative Example |  |
|---|---|---|---|---|---|---|---|
|  | 4 | 5 | 6 | 7 | 8 | 2 | 3 |
| Mixing amount (part) | | | | | | | |
| Perfluoro fluorine-containing rubber (a-2) | 50 | 50 | 74 | 50 | 70 | 100 | 100 |
| Fluorine-containing multi-segment polymer (b-1) | | | | | | | |
| ① | 50 | — | — | — | — | — | — |
| ② | — | 50 | 36 | — | — | — | — |
| ③ | — | — | — | 50 | 30 | — | — |
| Crosslinking agent (2,5-dimethyl-2,5-di(t-butylperoxy)hexane (PERHEXA 25B available from NOF Corporation)) | 0.5 | 0.5 | 0.5 | 0.5 | 0.5 | 0.5 | 0.5 |
| Crosslinking aid (TAIC) | 1 | 1 | 1 | 1 | 1 | 1 | 1 |
| Filler (Low molecular weight PTFE) | — | — | — | — | — | 0 | 10 |
| Results of measurement | | | | | | | |
| Vulcanizability (° C.) | | | | | | | |
| ML (kg · f) | 0.21 | 0.48 | 0.26 | 0.80 | 0.35 | 0.09 | 0.12 |
| MH (kg · f) | 6.08 | 6.95 | 6.26 | 6.80 | 5.45 | 8.0 | 5.9 |
| T10 (min) | 0.9 | 1.0 | 1.2 | 0.8 | 0.8 | 0.7 | 0.6 |
| T90 (min) | 2.0 | 2.5 | 2.3 | 2.8 | 2.0 | 1.5 | 1.3 |
| Physical properties in original state | | | | | | | |
| M100 (kg · f/cm²) | 28 | 38 | 29 | 112 | 39 | 16 | 23 |
| TS (kg · f/cm²) | 168 | 213 | 206 | 180 | 192 | 198 | 134 |
| EL (%) | 220 | 220 | 220 | 160 | 220 | 220 | 220 |
| HS (JIS A) | 69 | 74 | 71 | 83 | 72 | 60 | 65 |
| CS (20° C., 70 hours, 25% compression) | 39 | 44 | 36 | 50 | 34 | 18 | 20 |

TABLE 3

|  | Com. Ex. 4 | Ex. 9 | Com. Ex. 5 | Ex. 10 | Com. Ex. 6 | Ex. 11 | Com. Ex. 7 |
|---|---|---|---|---|---|---|---|
| Mixing amount (part) | | | | | | | |
| Perfluoro fluorine-containing rubber (a-2) | 0 | 50 | 0 | 50 | 0 | 50 | 0 |
| Fluorine-containing multi-segment polymer (b-1) | | | | | | | |
| ④ | 100 | 50 | — | — | — | — | — |
| ⑤ | — | — | 100 | 50 | — | — | — |
| ⑥ | — | — | — | — | 100 | 50 | — |
| ⑦ | — | — | — | — | — | — | 100 |
| Crosslinking agent (PERHEXA 25B) | 0.5 | 0.5 | 0.5 | 0.5 | 0.5 | 0.5 | 0.5 |
| Crosslinking aid (TAIC) | 1 | 1 | 1 | 1 | 1 | 1 | 1 |

TABLE 3-continued

|  | Com. Ex. 4 | Ex. 9 | Com. Ex. 5 | Ex. 10 | Com. Ex. 6 | Ex. 11 | Com. Ex. 7 |
|---|---|---|---|---|---|---|---|
| Filler (Low molecular weight PTFE) | — | — | — | — | — | — | — |
| Results of measurement |  |  |  |  |  |  |  |
| Vulcanizability (° C.) |  |  |  |  |  |  |  |
| ML (kg · f) | 0.02 | 0.03 | 0.15 | 0.08 | 0.34 | 0.12 | 0.47 |
| MH (kg · f) | 5.00 | 4.80 | 6.05 | 5.03 | 6.40 | 5.70 | 5.07 |
| T10 (min) | 1.0 | 0.9 | 1.0 | 0.9 | 1.0 | 0.8 | 1.0 |
| T90 (min) | 2.2 | 2.1 | 2.3 | 2.0 | 2.2 | 2.2 | 4.0 |
| Physical properties in original state |  |  |  |  |  |  |  |
| M100 | 30 | 20 | 35 | 22 | 41 | 28 | 35 |
| TS | 169 | 151 | 185 | 171 | 199 | 182 | 233 |
| EL | 210 | 210 | 210 | 220 | 200 | 210 | 240 |
| HS | 70 | 66 | 72 | 66 | 73 | 67 | 73 |
| CS | 63 | 42 | 59 | 46 | 47 | 34 | 59 |

From Tables 2 and 3, it can be seen that the fluorine-containing multi-segment polymer exhibits a very excellent mechanical properties when used solely or even when blended to a fluorine-containing rubber and that a hardness can be adjusted by blending with the rubber.

Industrial Applicability

According to the present invention, a fluorine-containing rubber composition being capable of providing a clean sealing material for semi-conductor production apparatuses without using a filler can be obtained.

What is claimed is:

1. A fluorine-containing rubber composition comprising (a-1) a non-perfluoro fluorine-containing rubber and (b-1) a fluorine-containing multi-segment polymer comprising an elastomeric fluorine-containing polymer chain segment and a non-elastomeric fluorine-containing polymer chain segment, in which the elastomeric fluorine-containing polymer chain segment and non-elastomeric fluorine-containing polymer chain segment comprises not less than 90% by mole of perhalo olefin as a component unit thereof, respectively.

2. A fluorine-containing rubber composition comprising (a-1) a non-perfluoro fluorine-containing rubber and (b-2) a fluorine-containing multi-segment polymer comprising an elastomeric fluorine-containing polymer chain segment and a non-elastomeric fluorine-containing polymer chain segment, in which the elastomeric fluorine-containing polymer chain segment comprises not less than 90% by mole of perhalo olefin as a component unit thereof and the non-elastomeric fluorine-containing polymer chain segment comprises less than 90% by mole of perhalo olefin as a component unit thereof.

3. The fluorine-containing rubber composition of claim 1, wherein the non-perfluoro fluorine-containing rubber (a-1) is a vinylidene fluoride fluorine-containing rubber, tetrafluoroethylene/propylene fluorine-containing rubber, fluoro silicone fluorine-containing rubber or fluoro phosphazine fluorine-containing rubber.

4. A fluorine-containing rubber composition comprising (a-2) a perfluoro fluorine-containing rubber and (b-1) a fluorine-containing multi-segment polymer comprising an elastomeric fluorine-containing polymer chain segment and a non-elastomeric fluorine-containing polymer chain segment, in which the elastomeric fluorine-containing polymer chain segment and non-elastomeric fluorine-containing polymer chain segment comprises not less than 90% by mole of perhalo olefin as a component unit thereof, respectively.

5. A fluorine-containing rubber composition comprising (a-2) a perfluoro fluorine-containing rubber and (b-2) a fluorine-containing multi-segment polymer comprising an elastomeric fluorine-containing polymer chain segment and a non-elastomeric fluorine-containing polymer chain segment, in which the elastomeric fluorine-containing polymer chain segment comprises not less than 90% by mole of perhalo olefin as a component unit thereof and the non-elastomeric fluorine-containing polymer chain segment comprises less than 90% by mole of perhalo olefin as a component unit thereof.

6. The fluorine-containing rubber composition of claim 4, wherein the perfluoro fluorine-containing rubber (a-2) is a fluorine-containing elastic copolymer comprising 45 to 90% by mole of tetrafluoroethylene, 10 to 50% by mole of perfluoro(alkyl vinyl ether) and 0 to 5% by mole of monomer giving a crosslinking site.

7. A molded article produced from the fluorine-containing rubber composition of claim 1.

8. The molded article of claim 7 which is a sealing material or molded article having a form of tube.

9. The fluorine-containing rubber composition of claim 2, wherein the non-perfluoro fluorine-containing rubber (a-1) is a vinylidene fluoride fluorine-containing rubber, tetrafluoroethylene/propylene fluorine-containing rubber, fluoro silicone fluorine-containing rubber or fluoro phosphazine fluorine-containing rubber.

10. The fluorine-containing rubber composition of claim 5, wherein the perfluoro fluorine-containing rubber (a-2) is a fluorine-containing elastic copolymer comprising 45 to 90% by mole of tetrafluoroethylene, 10 to 50% by mole of perfluoro(alkyl vinyl ether) and 0 to 5% by mole of monomer giving a cure site.

11. A molded article produced from the fluorine-containing rubber composition of claim 2.

12. A molded article produced from the fluorine-containing rubber composition of claim 4.

13. A molded article produced from the fluorine-containing rubber composition of claim 5.

14. The molded article of claim 11 which is a sealing material or a molded article having a form of tube.

15. The molded article of claim 12 which is a sealing material or a molded article having a form of tube.

16. The molded article of claim 13 which is a sealing material or a molded article having a form of tube.

17. The fluorine-containing rubber composition of claim 1, wherein the elastomeric fluorine-containing polymer chain segment has at least one of perhalo olefin units selected from the group consisting of tetrafluoroethylene, chlorotrifluoroethylene, hexafluoropropylene and a fluorovinyl ether represented by the formula (2):

$$CF_2=CFO(CF_2CFYO)_p-(CF_2CF_2CF_2O)_q-R_f \quad (2)$$

wherein Y is F or $CF_3$, $R_f$ is a perfluoroalkyl group having 1 to 5 carbon atoms, p is 0 or an integer of 1 to 5, and q is 0 or an integer of 1 to 5.

18. The fluorine-containing rubber composition of claim 1, wherein the non-elastomeric fluorine-containing polymer chain segment has at least one of perhalo olefin units selected from the group consisting of tetrafluoroethylene, chlorotrifluorethylene, perfluoro(alkyl vinyl ether), hexafluoropropylene and a compound represented by the formula (5):

$$CF_2=CF(CF_2)_pX \quad (5)$$

wherein p is an integer of 1 to 10, and X is F or Cl.

* * * * *